United States Patent
Toyoda et al.

(10) Patent No.: US 9,875,523 B2
(45) Date of Patent: Jan. 23, 2018

(54) IMAGE PROCESSING APPARATUS AND IMAGE PROCESSING METHOD

(71) Applicant: MITSUBISHI ELECTRIC CORPORATION, Tokyo (JP)

(72) Inventors: Yoshitaka Toyoda, Tokyo (JP); Kohei Kurihara, Tokyo (JP); Shotaro Moriya, Tokyo (JP); Takeo Fujita, Tokyo (JP); Narihiro Matoba, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 15/029,302

(22) PCT Filed: Jul. 10, 2014

(86) PCT No.: PCT/JP2014/068408
§ 371 (c)(1),
(2) Date: Apr. 14, 2016

(87) PCT Pub. No.: WO2015/083396
PCT Pub. Date: Jun. 11, 2015

(65) Prior Publication Data
US 2016/0247259 A1 Aug. 25, 2016

(30) Foreign Application Priority Data
Dec. 3, 2013 (JP) .................. 2013-249879

(51) Int. Cl.
*G06T 3/40* (2006.01)
*H04N 1/387* (2006.01)

(52) U.S. Cl.
CPC .............. *G06T 3/4053* (2013.01); *G06T 3/40* (2013.01); *H04N 1/387* (2013.01); *H04N 1/3871* (2013.01)

(58) Field of Classification Search
CPC ... G06T 3/4053; G06T 3/4061; G06T 3/4076; G06T 3/40; H04N 1/387; H04N 1/3871
See application file for complete search history.

(56) References Cited

U.S. PATENT DOCUMENTS 5,852,470 A 12/1998 Kondo et al.
2002/0172434 A1* 11/2002 Freeman .............. G06T 3/4053
382/299

(Continued)

FOREIGN PATENT DOCUMENTS

JP 2003-18398 A 1/2003
JP 2005-253000 A 9/2005

(Continued)

OTHER PUBLICATIONS

Kouda, "Creation Method of High-Definition Image using DCT Sign Index", The Transactions of the Institute of Electrical Engineers of Japan C, vol. 133, No. 3, The Institute of Electrical Engineers of Japan, Mar. 1, 2013, pp. 680 to 687.

*Primary Examiner* — Sean Motsinger
(74) *Attorney, Agent, or Firm* — Birch, Stewart, Kolasch & Birch, LLP

(57) ABSTRACT

An image processing apparatus and image processing method enlarge an input image (Din) to generate a low-resolution enlarged image (D101). Depending on a result of identification of the pattern of the input image (Din), coefficient data (D108) for conversion to a high-resolution are selected, and a feature component (D102H) of a low resolution is converted to a feature component (D103H) of a high resolution. Decision as to whether or not the pattern of a local region of the input image (Din) is flat is made. If it is flat, the coefficient data are so selected that no substantial alteration is made to pixel values in a high-resolution conversion unit (103). It is possible to reduce the circuit size (Continued)

and the memory capacity, and to improve the noise immunity, and achieve conversion to a high resolution suitable for implementation by hardware.

9 Claims, 15 Drawing Sheets

(56) References Cited

U.S. PATENT DOCUMENTS

| | | | |
|---|---|---|---|
| 2005/0226537 A1 | 10/2005 | Kondo et al. | |
| 2010/0074549 A1* | 3/2010 | Zhang | G06T 3/4053 382/263 |
| 2011/0026849 A1 | 2/2011 | Kameyama | |
| 2011/0222783 A1* | 9/2011 | Matsunobu | G06T 3/403 382/218 |
| 2012/0321214 A1 | 12/2012 | Hosokawa et al. | |
| 2013/0004061 A1 | 1/2013 | Sakurai et al. | |
| 2015/0071545 A1* | 3/2015 | Yang | G06K 9/46 382/190 |
| 2015/0154766 A1* | 6/2015 | Goshen | G06T 3/4053 382/131 |
| 2015/0227819 A1* | 8/2015 | Kimura | G06K 9/00 382/159 |
| 2015/0332435 A1* | 11/2015 | Motohashi | G06T 3/4053 382/171 |
| 2016/0078600 A1* | 3/2016 | Perez Pellitero | G06T 3/4053 382/155 |
| 2016/0247259 A1* | 8/2016 | Toyoda | G06T 3/40 |
| 2016/0253782 A1* | 9/2016 | Aoki | G06T 3/4053 382/168 |
| 2016/0253783 A1* | 9/2016 | Higashi | G06T 3/4053 382/168 |
| 2017/0109873 A1* | 4/2017 | Yang | G06T 5/50 |
| 2017/0140506 A1* | 5/2017 | Sato | G06T 3/4053 |

FOREIGN PATENT DOCUMENTS

| | | |
|---|---|---|
| JP | 2005-295355 A | 10/2005 |
| JP | 2007-193508 A | 8/2007 |
| JP | 2008-129188 A | 9/2008 |
| JP | 2011-35658 A | 2/2011 |
| JP | 2011-171843 A | 9/2011 |
| JP | 2013-3892 A | 1/2013 |
| WO | WO 2011/111819 A1 | 9/2011 |

* cited by examiner

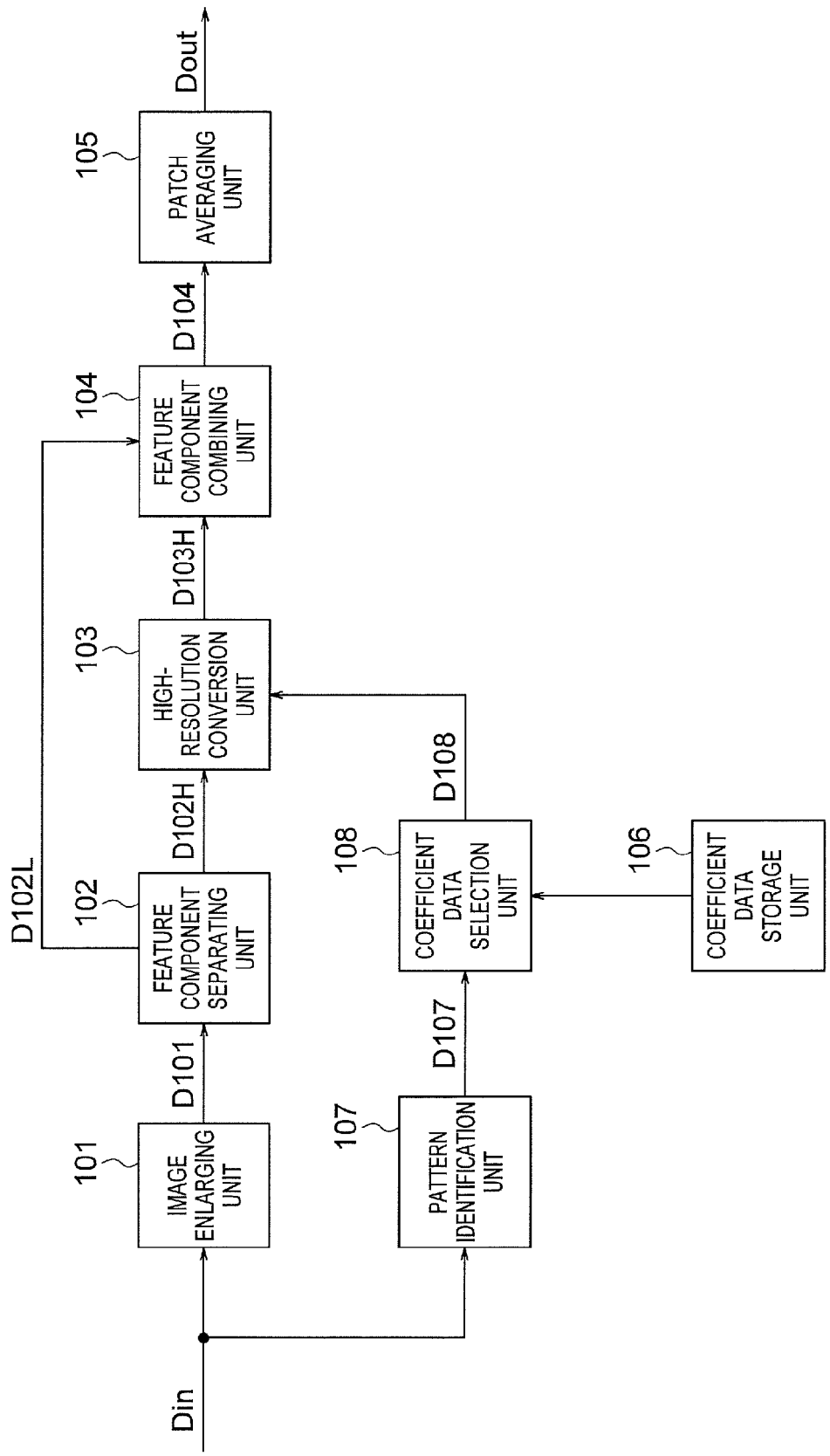

Din

D101

| P(1) | P(6) | P(11) | P(16) | P(21) |
|------|------|-------|-------|-------|
| P(2) | P(7) | P(12) | P(17) | P(22) |
| P(3) | P(8) | P(13) | P(18) | P(23) |
| P(4) | P(9) | P(14) | P(19) | P(24) |
| P(5) | P(10)| P(15) | P(20) | P(25) |

$$\begin{pmatrix} dl_1 \\ dl_2 \\ dl_3 \\ dl_4 \\ \vdots \\ dl_{24} \\ dl_{25} \end{pmatrix}$$

FIG. 6

| Q(1) | Q(4) | Q(7) |
|------|------|------|
| Q(2) | Q(5) | Q(8) |
| Q(3) | Q(6) | Q(9) |

FIG. 10

| FLATNESS DECISION SIGNAL Flat | 0 | | 0 | | | 1 |
|---|---|---|---|---|---|---|
| PATTERN NUMBER Pnum | 0 | 1 | 2 | ... | 254 | 255 | 0~255 |
| PATTERN IDENTIFICATION SIGNAL D107 | 0 | 1 | 2 | ... | 254 | 255 | 256 |

Dti

| D307 | PAIR NUMBER |
|---|---|
| 0 | xx, xx, xx, ⋯ |
| 1 | xx, xx, xx, ⋯ |
| 2 | xx, xx, xx, ⋯ |
| 3 | xx, xx, xx, ⋯ |
| 4 | xx, xx, xx, ⋯ |
| 5 | xx, xx, xx, ⋯ |
|  |  |
| 253 | xx, xx, xx, ⋯ |
| 254 | xx, xx, xx, ⋯ |
| 255 | xx, xx, xx, ⋯ |
| 256 | xx, xx, xx, ⋯ |

FIG. 17

| P(1) | P(6) | P(11) | P(16) | P(21) | — LPc |
|---|---|---|---|---|---|
| P(2) | P(7) | P(12) | P(17) | P(22) | |
| P(3) | P(8) | P(13) | P(18) | P(23) | |
| P(4) | P(9) | P(14) | P(19) | P(24) | — HPc |
| P(5) | P(10) | P(15) | P(20) | P(25) | |

IMAGE PROCESSING APPARATUS AND IMAGE PROCESSING METHOD

TECHNICAL FIELD

The present invention relates to an image processing apparatus and method using a single input image, to generate an output image having a higher resolution than the input image.

BACKGROUND ART

There is known an image capture apparatus having a function (digital zoom function) of extracting an image of only a desired range from the captured image, and enlarging the extracted image to perform electronic zooming. In a conventional digital zoom, a bilinear method, a bicubic method, or the like is used for enlarging the image; in recent years, a method called super-resolution process which can generate information of a high resolution which is not present in the input image, for the purpose of generating a digital zoom image which has a sense of higher resolution, has come to be used.

As a method achieving a high resolution with a high quality, using a super-resolution process from a single image, a super-resolution process using a learned database is known. This method refers to a database having been obtained, by learning, examples of correspondence between a high resolution image and a low resolution image, to predict information of a high resolution which is not present in the input image, and thereby to realize a high-resolution (see, for example, patent reference 1).

In the super-resolution process described in patent reference 1, a search vector is generated for each of the patches into which an interpolated image has been divided, and a high-frequency component data corresponding to an index vector having the highest similarity to the search vector is determined by search to predict a patch of a high resolution.

PRIOR ART REFERENCES

Patent References

Patent reference 1: Japanese Patent Application Publication No. 2003-018398 (paragraphs 0014 to 0017)

SUMMARY OF THE INVENTION

Problems to be Solved by the Invention

However, in the super-resolution process described in patent reference 1, similarity calculation needs to be performed for each of the dimensions of the search vector, for each patch, so that the amount of calculation per patch is large, and the size of the circuit is large. Moreover, a large number of patches need to be stored in the learned database, and the required capacity of the memory is large. The method is there unsuitable for implementation by hardware.

Also, a common problem for the super-resolution process using a learned database, is that it is less immune to noise. That is, if even a small amount of noise is included in the patch of interest, learned data which are different from the one which ought to be referred to, are referred to, causing deterioration in the picture quality. When the number of dimensions of the search vector, or the number of patches in the learned database is reduced, in order to reduce the circuit size or the memory capacity, the problem becomes more prominent.

The present invention is addressed to the problems discussed above, and provides an image processing apparatus and an image processing method in which the circuit size and the memory capacity are reduced, while at the same time the immunity to the noise is improved, and which is suitable for implementation by hardware, and which is capable of obtaining a high-quality image of a high resolution.

Means for Solving the Problem

An image processing apparatus according to the present invention comprises:

an image enlarging unit for enlarging an input image to generate a low-resolution enlarged image;

a feature component separating unit for separating said low-resolution enlarged image into a feature component of a low resolution and a non-feature component for each patch;

a high-resolution conversion unit for converting said feature component of the low resolution into a feature component of a high resolution;

a feature component combining unit for combining said feature component of the high resolution and said non-feature component to generate a high-resolution patch;

a patch averaging unit for averaging, for each pixel, values of one or more high-resolution patches to generate an output image;

a coefficient data storage unit for storing a plurality of sets of coefficient data respectively corresponding to a plurality of mutually different patterns;

a pattern identification unit for identifying a pattern of a local region in said input image, corresponding to a patch in said low-resolution enlarged image, and outputting a pattern identification signal indicating a result of the identification; and a coefficient data selection unit for selecting, from among the plurality of sets of coefficient data stored in said coefficient data storage unit, a set of coefficient data corresponding to said pattern identification signal, and outputting the selected set of coefficient data; wherein said high-resolution conversion unit converts said feature component of the low resolution into said feature component of the high resolution, using said coefficient data selected by said coefficient data selection unit.

Effects of the Invention

According to the present invention, the circuit size and the memory capacity can be reduced, while at the same time immunity to noise is improved, and a high resolution image of a high quality can be obtained by a configuration which is suitable for implementation by hardware.

BRIEF DESCRIPTION OF THE DRAWINGS

FIG. 1 is a block diagram showing an image processing apparatus according to a first embodiment of the present invention.

FIG. 6 is a drawing showing an arrangement of pixels in the high-resolution image corresponding to the constituent elements of a column vector formed of the feature quantities ($dh_1$ to $dh_9$) of the high-resolution image obtained by conversion.

FIG. 10 is a drawing showing a rule of generating a pattern identification signal D107.

FIG. 14 is a drawing showing an example of classification of patch pairs.

FIG. 17 is a drawing showing the relationship between the patches formed of NL×NL pixels in the low-resolution enlarged image, and the patches formed of NH×NH pixels in a high-resolution image.

MODE FOR CARRYING OUT THE INVENTION

First Embodiment

Figure 2A:
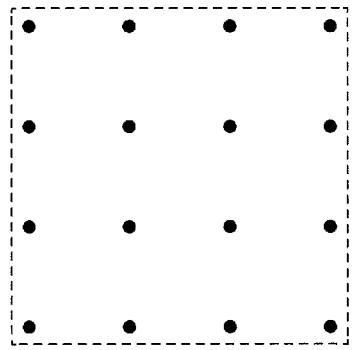
FIGS. 2(a) and (b) are drawings showing an input image and a low-resolution enlarged image obtained by enlarging the input image.

FIG. 1 shows an image processing apparatus according to the first embodiment of the present invention. The illustrated image processing apparatus is provided with an image enlarging unit 101 for enlarging an input image Din to generate a low-resolution enlarged image D101, a feature component separating unit 102 for separating the low-resolution enlarged image D101 into a feature component D102H of a low resolution and a non-feature component D102L for each patch in the low-resolution enlarged image D101, a high-resolution conversion unit 103 for converting the feature component D102H of the low resolution to a feature component D103H of a high resolution, a feature component combining unit 104 for combining the feature component D103H of the high resolution and the non-feature component D102L to generate a high-resolution patch D104, a patch averaging unit 105 for averaging the values of the one or more high resolution patches pertaining to each pixel to generate an output image Dout, a coefficient data storage unit 106 for storing a plurality of sets of coefficient data D106 respectively corresponding to a plurality of mutually different patterns, a pattern identification unit 107 for identifying the pattern of a local region in the input image Din, corresponding to the patch in the low-resolution enlarged image, and outputting a pattern identification signal D107 indicating the result of the identification, and a coefficient data selection unit 108 for selecting, from among the plurality of sets of coefficient data D106 stored in the coefficient data storage unit 106, a set of coefficient data D108 corresponding to the pattern identification signal D107, and outputting the selected set of coefficient data D108.

The high-resolution conversion unit 103 converts the feature component D102H of the low resolution to the feature component D103H of the high resolution using the coefficient data D108 selected by the coefficient data selection unit 108.

The processes performed by each part will be described below in further detail.

Figure 2B:
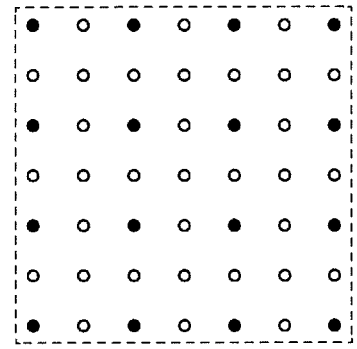

The image enlarging unit 101 enlarges the input image Din shown in FIG. 2(a), for example, to generate a low-resolution enlarged image D101 shown in FIG. 2 (b). In FIGS. 2(a) and (b), each of the dots represents a pixel. The enlargement of the image is performed by for example a bicubic method. The enlargement factor is, for example, two in each of the horizontal direction and the vertical direction. Among the pixels in the enlarged image D101 in FIG. 2(b), the pixels represented by the black dots are the pixels at the same positions as the pixels in the input image Din shown in FIG. 2(a).

The feature component separating unit 102 separates each of the patches (groups of pixels in small regions) in the low-resolution enlarged image D101 (FIG. 2(b)) into the feature component D102H of the low resolution and the non-feature component D102L.

The patches in the low-resolution enlarged image D101 are formed to overlap each other.

Figure 3:
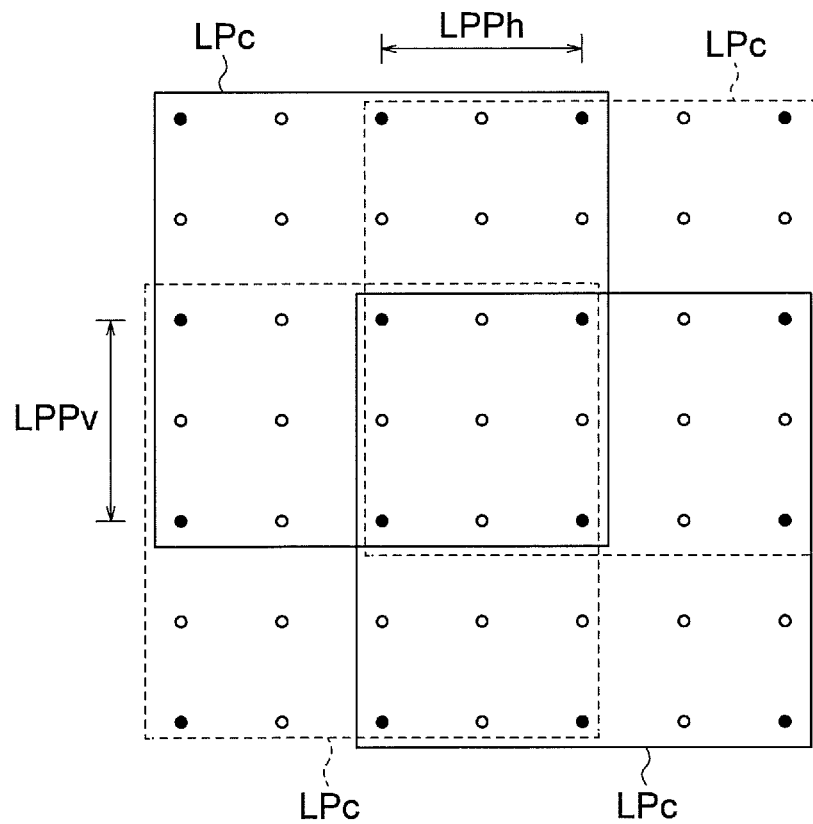
FIG. 3 is a drawing showing an arrangement of patches in the low-resolution enlarged image, and pixels included in each patch.

For example, as shown in FIG. 3, each patch LPc is a rectangular region consisting of NL×NL pixels. NL is for example five, and the pitch of the patches (distance between the centers of the patches) is two pixels in each of the horizontal direction and the vertical direction, with the result that there is an overlap of three pixels in the horizontal direction between patches adjacent to each other in the horizontal direction, and there is an overlap of three pixels in the vertical direction between patches adjacent to each other in the vertical direction.

Because the pitches LPPh and LPPv in the horizontal direction and the vertical direction are both two, the pixels positioned at the centers of the patches are disposed in every other row, and in every other column.

For each of the patches LPC consisting of NL×NL pixels in the low-resolution enlarged image D101, the feature component separating unit 102 determines a mean value lMean of the NL×NL pixels, and outputs it as the non-feature component D102L, and subtracts the mean value lMean from the pixel value of each of the pixels to obtain NL×NL difference values as feature quantities, and to obtain a column vector by arranging the feature quantities in a predefined order, and outputs the column vector as the feature component D102H.

Figures 4A, 4B, 5:
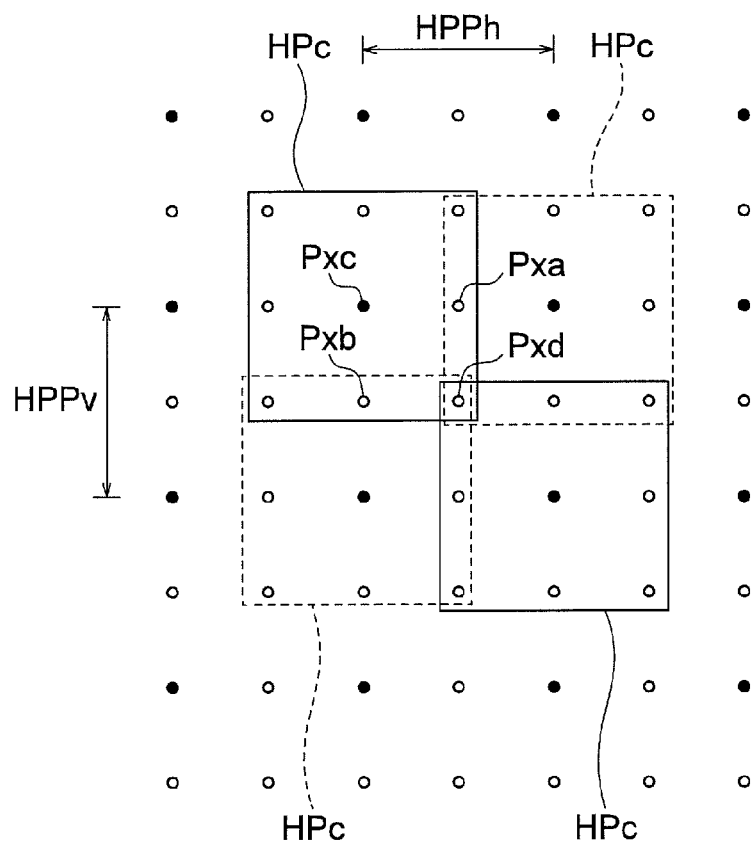
FIGS. 4(a) and (b) are drawings showing correspondence relations between an arrangement of pixels in each patch in the low-resolution enlarged image, and constituent elements of a column vector formed of difference values ($dl_1$ to $dl_{25}$) pertaining to respective pixels.
FIG. 5 is a drawing showing an arrangement of patches in a high-resolution enlarged image, and pixels included in each patch.

For example, as shown in FIG. 4(a), the pixels P(1) to P(25) are extracted in the order of the numbers (the numerals in the parentheses), and their difference values $dl_1$ to $dl_{25}$ are taken as the feature quantities, and are arranged sequentially from the top, to form the column vector as shown in FIG. 4(b).

The feature component D102H is obtained by subtracting the mean value from the pixel value of each pixel, so that it represents a high frequency component of the patch, while the non-feature component D102L can be said to represent a low frequency component of the patch.

Among the image components of the low-resolution enlarged image D101, the feature component separating unit 102 separates or extracts only the feature component (high frequency component), that is used for the prediction performed in the high-resolution conversion unit 103, and it thus has the function of normalizing the input to the high-resolution conversion unit 103.

Using the coefficient data D108 selected by the coefficient data selection unit 108, the high-resolution conversion unit 103 converts the feature component D102H of the low resolution to the feature component D103H of a high resolution. This conversion is conversion from the feature component of the patch in the low-resolution enlarged image into the feature component of the patch in the high-resolution image at a corresponding position. Here, "corresponding" with respect to "position" means that the position of the pixel at the center of the patch in the high-resolution image coincides with the position of the pixel at the center of the low-resolution enlarged image, in other words, that the central positions of the patches coincide when the high-resolution image is superimposed on the low resolution enlarged image. The patch in the low-resolution enlarged image and the patch in the high-resolution image having the central positions corresponding to each other form a patch pair.

The patches in the high-resolution image are also formed to overlap each other.

For example, as shown in FIG. 5, each patch HPc is a rectangular region consisting, for example, of NH×NH pixels. NH is for example three. The pitch HPPh of the patches in the horizontal direction and the pitch HPPv of the patches in the vertical direction are both two pixels, so that there is an overlap of one pixel between patches adjacent to each other in the horizontal direction, and there is an overlap of one pixel between patches adjacent to each other in the vertical direction.

In the example shown in FIG. 5, the pixels positioned at the centers of the patches HPc in the high-resolution image D103H are disposed at every other row and at every other column, as are the pixels positioned at the centers of the patches LPc in the low-resolution enlarged image D101 and the centers of the patches HPc in the high-resolution image D103H coincide with the centers of the patches LPc in the low-resolution enlarged image D101.

The coefficient data D108 define the relation between each patch in the low-resolution enlarged image and a corresponding patch in the high-resolution image, and are supplied from the coefficient data selection unit 108.

If the feature component D102H of each patch in the low-resolution enlarged image is defined by a column vector nlp having NL×NL values $dl_1$ to $dl_{NL \times NL}$ (feature component values of the pixels constituting each patch in the low-resolution enlarged image), the feature component D103H of the corresponding patch in the high-resolution image is defined by a column vector nhp having NH×NH values $dh_1$ to $dh_{NH \times NH}$ (feature component values of the corresponding pixels in the high-resolution image), and the coefficient data D108 are defined by a matrix M consisting of components in NH×NH rows and NL×NL columns, the conversion at the high-resolution conversion unit 103 is represented by the following equation (1).

[Mathematical Expression 1]

$$nhp = M \times nlp \qquad (1)$$

The equation (1) can be rewritten as the following equation (2), using matrixes for the case of NL=5 and NH=3.

[Mathematical Expression 2]

$$\begin{pmatrix} dh_1 \\ dh_2 \\ \vdots \\ \vdots \\ dh_9 \end{pmatrix} = \begin{pmatrix} m_{1,1} & m_{2,1} & \cdots & \cdots & m_{25,1} \\ m_{1,2} & m_{2,2} & \cdots & \cdots & m_{25,2} \\ \vdots & \vdots & & & \vdots \\ \vdots & \vdots & & & \vdots \\ m_{1,9} & m_{2,9} & \cdots & \cdots & m_{25,9} \end{pmatrix} \times \begin{pmatrix} dl_1 \\ dl_2 \\ \vdots \\ \vdots \\ dl_{25} \end{pmatrix} \qquad (2)$$

Figure 6:
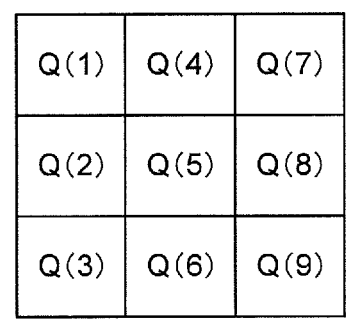

The left side of the equation (2) is obtained by sequentially arranging, from the top, the difference values $dh_1$ to $dh_9$ of the pixels Q(1) to Q(9) shown in FIG. 6, in the order of their numbers (numerals in the parentheses). The pixels Q(1) to Q(9) shown in FIG. 6 are those at 3×3 positions, namely the positions corresponding to P(7), P(8), P(9), P(12), P(13), P(14), P(17), P(18) and P(19), in the central part among the pixels shown in FIG. 4 (a).

The equation (1) and the equation (2) indicate that the value of each pixel in the feature component D103H of the high-resolution is obtained by weighted addition of all of the NL×NL pixels of the feature component D102H of the low-resolution.

The matrix M is formed of coefficient data D108 selected by the coefficient data selection unit 108. The coefficient data selection unit 108 selects a set of coefficient data among the plurality of sets of coefficient data D106 stored in the coefficient data storage unit 106, and supplies the selected set of coefficient data to the high-resolution conversion unit 103. Each set of coefficient data stored in the coefficient data storage unit 106 are a linear regression model approximating the relation of the pair consisting of the feature component D102H of the low-resolution image generated from the training image, and the feature component D103H of the high-resolution image, and are obtained in advance by performing learning. A method of generating the coefficient data will be described later.

Incidentally, the conversion from the feature component D102H of the low resolution into the feature component D103H of the high resolution may be non-linear. In such a case, as the coefficient data D108, those defining coefficients of non-linear function are used.

The feature component combining unit 104 combines the feature component D103H of the high resolution and the non-feature component D102L to generate a high-resolution patch D104.

For example, the feature component combining unit 104 adds the mean value lMean (=D102L) of the NL×NL pixels of the patch in the low-resolution enlarged image to the respective components (values pertaining to the respective pixels) $dh_1$ to $dh_9$ of the feature component D103H of the high resolution.

The feature component combining unit 104 adds the non-feature component (low-frequency component) lMean separated at the feature component separating unit 102, to the feature component of the high resolution, and thus has the function of removing the effects of the normalization made by the feature component separating unit 102.

The combination by the feature component combining unit 104 is represented by the following equation (3).

[Mathematical Expression 3]

$$hp = c \cdot nhp + lMean \quad (3)$$

In the equation (3), hp is a column vector having NH×NH values $h_1$ to $h_{NH \times NH}$ representing pixel values of pixels constituting the high-resolution patch D104, nhp is a column vector having the feature component values $dh_1$ to $dh_{NH \times NH}$ of NH×NH pixels constituting the feature component D103H of the high-resolution patch, lMean is a scalar value representing the non-feature component D102L, and c is a scalar value (constant) for adjusting the gain for the feature component of the high resolution (high-frequency component).

The equation (3) can be rewritten as the following equation (4), using matrixes for the case of NH=3.

[Mathematical Expression 4]

$$\begin{pmatrix} h_1 \\ h_2 \\ \vdots \\ \vdots \\ h_9 \end{pmatrix} = c \times \begin{pmatrix} dh_1 \\ dh_2 \\ \vdots \\ \vdots \\ dh_9 \end{pmatrix} + lMean \quad (4)$$

In the equation (3) or the equation (4), a result of estimation exactly corresponding to the result of the learning can be obtained by putting c=1.

By putting c>1, the feature component of the high resolution (high-frequency component) is intentionally strengthened (enhanced), thereby to increase the sense of high resolution of the output image.

The computation according to the equation (3) or the equation (4) is performed for each of the high-resolution patches.

As was described earlier, the patches are formed to overlap each other, so that some pixels belong to a plurality of patches. In the example of FIG. 5, among the pixels in the high-resolution image, the pixel Pxc positioned at the center of each patch belongs to a single patch LPc, the pixels Pxa horizontally adjacent to the central pixel Pxc and the pixels Pxb vertically adjacent to the central pixel Pxc belong to two patches LPc, and the pixels Pxd diagonally adjacent to the central pixel Pxc belong to four patches LPc.

For the pixels belonging to two patches, two results of computation according to the equation (3) or the equation (4), i.e., the pixel values of the pixels determined in the generation of the respective patches, are obtained; for the pixels belonging to four patches, four results of computation according to the equation (3) or the equation (4) are obtained; for the pixels belonging to a single patch, just one result of computation according to the equation (3) or the equation (4) is obtained.

The patch averaging unit 105 averages one or more high-resolution patch values (the pixel values of the pixels determined in the generation of the respective patches) for each pixel in the high-resolution image, thereby to generate the output image Dout. That is, for the pixels belonging to two patches, two patch values are averaged; for the pixels belonging to four patches, four patch values are averaged; for the pixels belonging to just one patch, the single patch value is output as it is.

The computation according to the equation (3) or the equation (4) can be said to be an estimation of a pixel value candidate using one or more high-resolution patches for each pixel in the output image Dout, and the averaging can be said to be a process of determining an average (a simple average or a weighted average) of one or more pixel value candidates. By this averaging, a final output pixel value is obtained.

The coefficient data storage unit 106 stores a plurality of sets of coefficient data defining the correspondence relation between the high-resolution image and the low-resolution image data, for the respective patterns. The pattern as referred to here means a pattern of variation in the pixel values in each part of the image, and what pattern each part of the image has is determined by the pattern identification unit 107.

Figure 7:
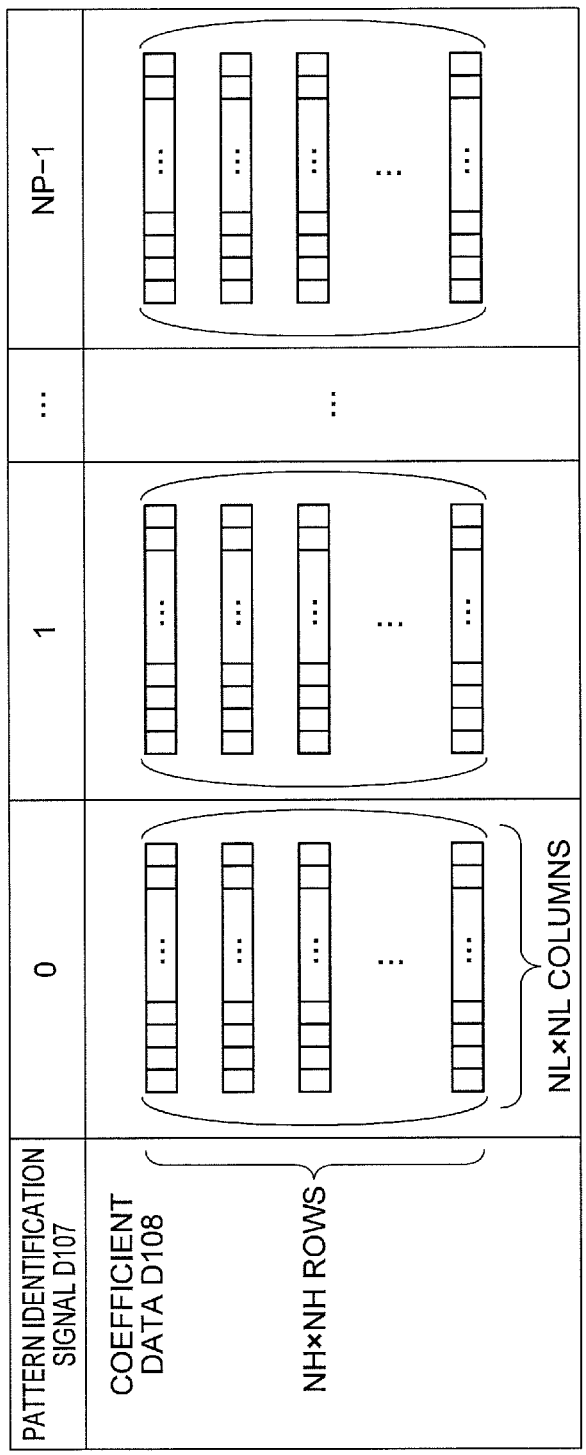
FIG. 7 is a drawing showing an example of coefficient data stored in a coefficient data storage unit 106.

FIG. 7 shows the contents of the coefficient data D106 stored by the coefficient data storage unit 106. In the example of configuration of the coefficient data storage unit 106 shown in FIG. 7, the coefficient data D106 are represented by a matrix M consisting of the components in NH×NH rows and NL×NL columns used in the equation (1) or the equation (2), and are defined for each of the values 0, 1, . . . , NP−1 (NP being the number of patterns) of the pattern identification signal D107. When the pattern identification signal D107 is input to the coefficient data storage unit 106, the coefficient data are selected and read, using the value of the input pattern identification signal D107 as an index.

The pattern identification unit 107 takes, as a pixel of interest, the pixel in the input image Din, at the position corresponding to the center of the patch in the low-resolution enlarged image D101, and identifies the pattern of the local region centered around the pixel of interest, and outputs the pattern identification signal D107 indicating the result of the identification.

The local region as referred here means a region in the input image Din, corresponding to each patch in the low-resolution enlarged image; when the enlargement factors in the horizontal direction and the vertical direction are two, it is a rectangular region consisting of an array of 3×3 pixels having a center coincident with the center of each patch in the low-resolution enlarged image. As the pattern, a local binary pattern (LBP) is assumed to be used.

Figure 8:
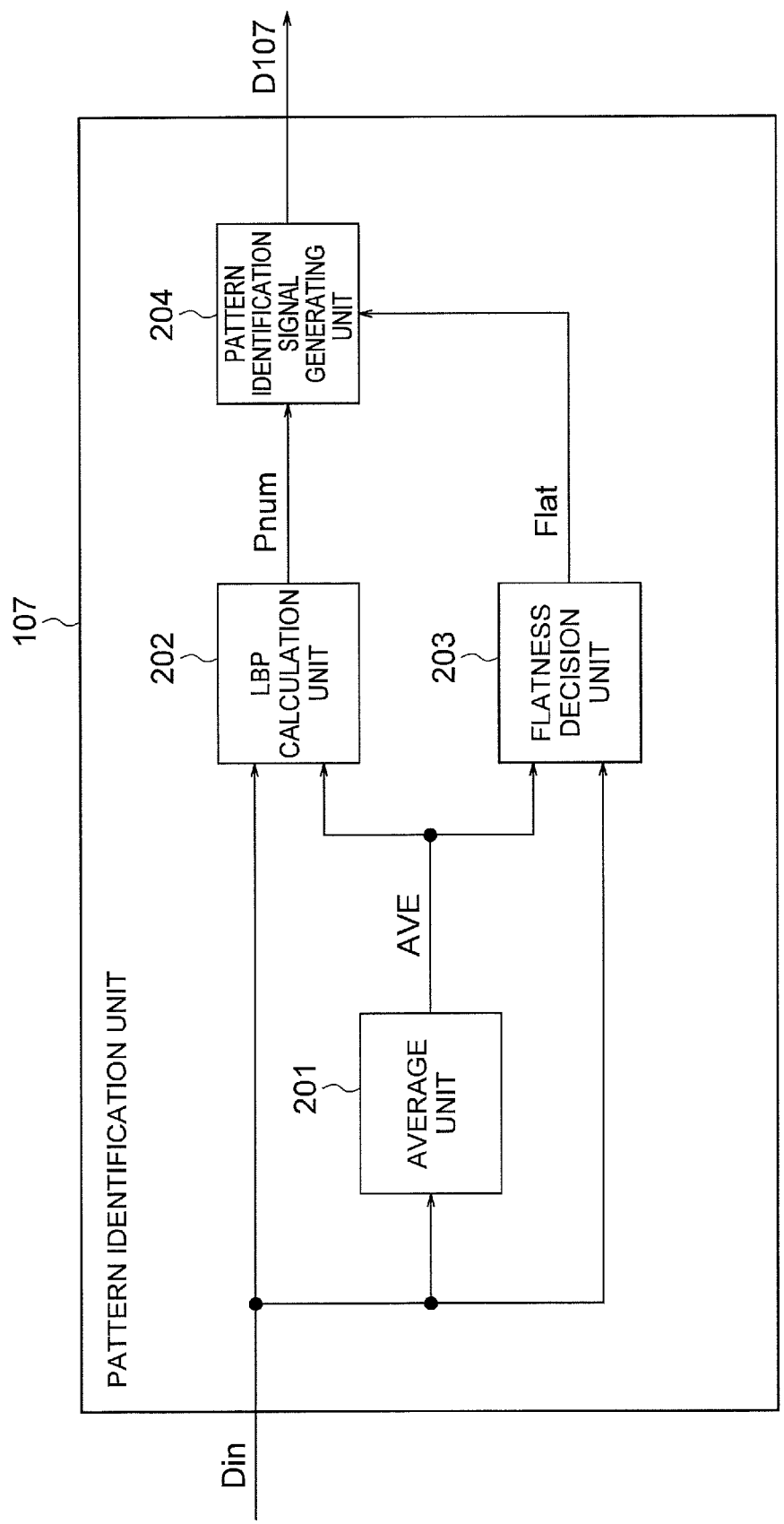
FIG. 8 is a block diagram showing an example of configuration of a pattern identification unit 107.

FIG. 8 is a drawing showing an example of configuration of the pattern identification unit 107.

The pattern identification unit 107 is provided with an average unit 201 for determining an average value AVE of pixel values of the pixels in the local region in the input image Din, an LBP calculation unit 202 for comparing the pixel values of the pixels neighboring the pixel of interest, with the average value AVE, and generating a pattern number Pnum representing the combination of the results of the comparison pertaining to the respective ones of the neighboring pixels; a flatness decision unit 203 for deciding whether or not the region is flat, based on the absolute differences between the pixel values of the pixels neighboring the pixel of interest and the average value AVE, and outputting a flatness decision signal Flat indicating the result of the decision, and a pattern identification signal generating unit 204 for generating the pattern identification signal D107 based on the pattern number Pnum and the flatness decision signal Flat.

The average unit 201 determines the average value AVE of the pixel values of the pixels in the local region, e.g., the region of 3×3 pixels, centered around the pixel of interest in the input image Din (the pixel corresponding to the pixel at the center of each patch in the low-resolution enlarged image D101).

The average may be a simple average of the pixel values of the 3×3 pixels, or a weighted average with a weight for the central pixel being larger. An example of computation for determining the weighted average is shown by the following equation (5).

[Mathematical Expression 5]

$$AVE = \frac{imLBP(-1,-1)}{16} + \frac{imLBP(0,-1)}{8} + \frac{imLBP(1,-1)}{16} + \frac{imLBP(-1,0)}{8} + \frac{imLBP(0,0)}{4} + \frac{imLBP(1,0)}{8} + \frac{imLBP(-1,1)}{16} + \frac{imLBP(0,1)}{8} + \frac{imLBP(1,1)}{16} \quad (5)$$

Here, (s, t) represents offset coordinates with respect to the central pixel among the 3×3 pixels, and imLBP(s, t) represents a pixel value of the input image Din at the coordinates (s, t).

The LBP calculation unit 202 compares the pixel values of the eight pixels in the vicinity of the pixel of interest, with the average value AVE, and generates the pattern number Pnum representing the combination of the results of the comparison pertaining to the respective ones of these pixels. The result of the comparison indicates whether or not the pixel value is not smaller than the average value AVE, and is represented by a binary value of "1" or "0", for example. The combination of the results of comparison is a sequence of numbers obtained by arranging, in a predetermined order, the values indicating the results of comparison.

Figure 9:
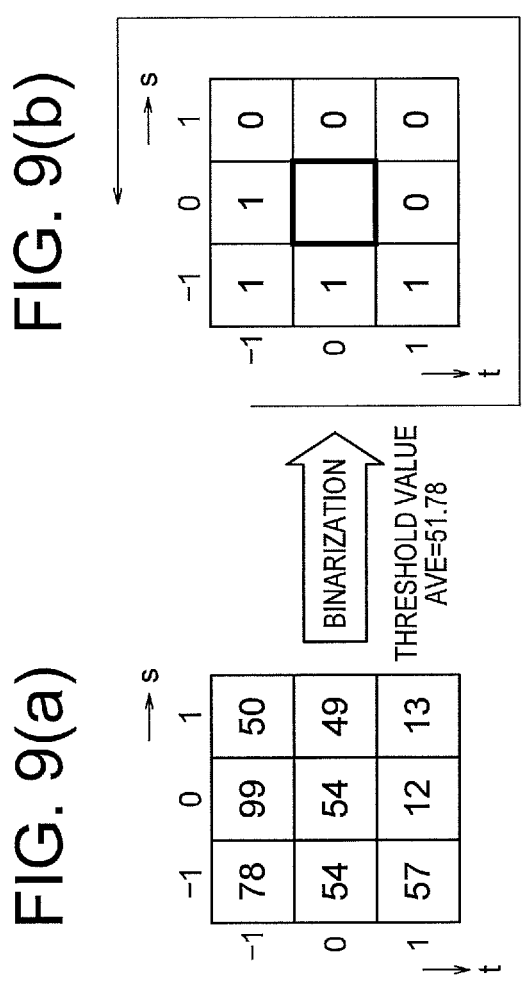
FIGS. 9(a) to (c) are drawings showing an example of LBP calculation on a 3×3 pixel array.

FIGS. 9(*a*) to 9(*c*) show an example of calculation of an LBP for a certain 3×3 pixel array.

In FIG. 9(*a*), the number indicated in each square at a position indicated by the offset coordinates (s, t) with respect to the central pixel represents a pixel value of each pixel in the region of 3×3 pixels.

In the LBP calculation unit 202, first, the pixel values of the eight pixels in the vicinity of the pixel of interest are compared with the average value AVE (AVE=51.78 in the case of equation (5)) of the pixel values of the 3×3 pixels, and the value of each pixel is binarized into "1" if it is not smaller than AVE, or "0" if it is smaller than AVE.

FIG. 9(*b*) shows the results of the binarization. The binarization is represented by the following equation (6).

[Mathematical Expression 6]

$$D(s,t) = \begin{cases} 0 & \text{when } imLBP(s,t) < AVE \\ 1 & \text{when } imLBP(s,t) \geq AVE \end{cases} \quad (6)$$

Here, D(s, t) represents the result of binarization of the pixel at the coordinates (s, t).

Next, an eight bit value is generated by allocating the binarization result of the pixel at the coordinates (s, t)=(−1, −1) to a first bit, allocating the binarization result of the pixel at the coordinates (s, t)=(−1, 0) to a second bit, and arranging (allocating to the respective bit positions) the subsequent binarization results taken successively in the counterclockwise direction, and outputting the eight-bit value as the pattern number Pnum. The determination of the pattern number is represented by the following equation (7).

[Mathematical Expression 7]

$$Pnum = D(-1,-1)\cdot2^0 + D(-1,0)\cdot2^1 + D(-1,1)\cdot2^2 + D(0,1)\cdot2^3 + D(1,1)\cdot2^4 + D(1,0)\cdot2^5 + D(1,-1)\cdot2^6 + D(0,-1)\cdot2^7 \quad (7)$$

In the case of the 3×3 pixel array of FIG. 9(*a*), the pattern number Pnum calculated by the equation (7) is "135", as shown in FIG. 9(*c*).

In a known LBP calculation method, the binarization is performed by comparison between the pixel value of the central pixel, and the pixel values of the eight pixels in the vicinity; in contrast, in the first embodiment, the binarization is performed by comparison between the average value AVE of 3×3 pixels, and the pixel values of the eight pixels in the vicinity, enabling extraction of a pattern information with reduced noise effects.

The flatness decision unit 203 decides whether or not the region is flat depending on whether or not an average of the absolute differences between the pixel values of the pixels neighboring the pixel of interest and the average value AVE is smaller than a predetermined threshold value, and outputs the flatness decision signal Flat indicating the result of the decision.

Specifically, an average diff of the absolute differences between the pixel values of the eight pixels in the vicinity of the pixel of interest and the average value AVE is calculated by the following equation (8).

[Mathematical Expression 8]

$$diff = \frac{1}{8} \times \sum_{j=-1}^{+1} \sum_{i=-1}^{+1} |imLBP(i,j) - AVE| \quad (8)$$

If the average diff of the absolute differences is smaller than a preset threshold sig, the region is found to be flat, and the flatness decision signal Flat is set to "1". If the average diff of the absolute differences is not smaller than the threshold sig, the region is not found to be flat, and the flatness decision signal Flat is set to be "0". The flatness decision is shown by the equation (9).

[Mathematical Expression 9]

$$Flat = \begin{cases} 0 & \text{when } diff \geq sig \\ 1 & \text{when } diff < sig \end{cases} \quad (9)$$

The pattern identification signal generating unit 204 generates the pattern identification signal D107 from the pattern number Pnum and the flatness decision signal Flat. A rule of generating the pattern identification signal D107 from the combination of the pattern number Pnum and the flatness decision signal Flat is shown in FIG. 10.

In the example shown in FIG. 10, when the flatness decision signal Flat is "0", the value of the pattern number Pnum itself is output as the pattern identification signal D107. When the flatness decision signal Flat is "1", a predetermined pattern identification number, "256", indicating the flatness is output, without regard to the pattern number Pnum. Because of this process, the pattern is identified as one of 257 patterns.

As the coefficient data corresponding to the pattern identification signal D107 when the flatness decision signal Flat is "1", (256 in the case of FIG. 10), an identity matrix or a matrix close to an identity matrix is preset. The "identity matrix" as referred to here means a matrix, in which, in the calculation of the difference values pertaining to the respective pixels in the high-resolution image, the coefficients pertaining to the pixels in the low-resolution image, corresponding to the above-mentioned respective pixels are "1" and other coefficients are "0", that is, a matrix, in which the elements in the first to sixth, tenth, eleventh, fifteenth, sixteenth, and twentieth to twenty-fifth columns are all "0", and the elements on a diagonal line which could be drawn from the upper left to the lower right if there were only the remaining columns are "1", and other elements are "0"; and a "matrix close to an identity matrix" is a matrix in which "1" in the above-mentioned matrix is replaced with a value close to "1", e.g., smaller than 1 and larger than 0.9, and "0" in the above-mentioned matrix is replaced with a value close to "0", e.g., larger than "0" and smaller than 0.1. By using such a matrix, the high-resolution conversion unit 103 is prevented from substantially altering the pixel values when the local region corresponding to the patch is found to be flat.

To perform a similar process, the configuration may be such that the flatness decision signal Flat is input (not illustrated as such) to the high-resolution conversion unit 103, the computation at the high-resolution conversion unit 103 is performed by using the equation (1) or the equation (2) when the flatness decision signal Flat is "0"; and when the flatness decision signal Flat is "1", the computation according to the equation (1) or the equation (2) is not performed, and a column vector obtained by arranging, as the 1st to 9th elements, part of the feature component D102H of the low resolution, that is, the 7th to 9th, 12th to 14th, and 17th to 19th elements in the feature component D102H consisting of the column vector having 25 elements are output as the feature component D103H of the high resolution.

As has been described above, the pattern identification unit 107 identifies the pattern of the local region of the input image Din, and outputs the pattern identification signal D107 indicating the result of the identification.

The coefficient data selection unit 108 selects a set of coefficient data corresponding to the pattern identification signal D107, among a plurality of sets of coefficient data D106 stored in the coefficient data storage unit 106, and outputs the selected set as the selected coefficient data D108.

As was explained in connection with FIG. 7, the coefficient data storage unit 106 stores matrixes M each consisting of components in NH×NH rows and NL×NL columns, and used in the equation (1) or the equation (2), for the respective ones of the values 0, 1, . . . , NP−1 of the pattern identification signal D107. In response to the pattern identification signal D107, the coefficient data selection unit 108 reads the matrix M corresponding to the value of the pattern identification signal D107, from the coefficient data storage unit 106, and outputs the matrix as the coefficient data D108.

This completes a description of the respective constituent elements of the image processing apparatus according to the first embodiment.

Next, the operation of the image processing apparatus according to the first embodiment will be described.

Figure 11:
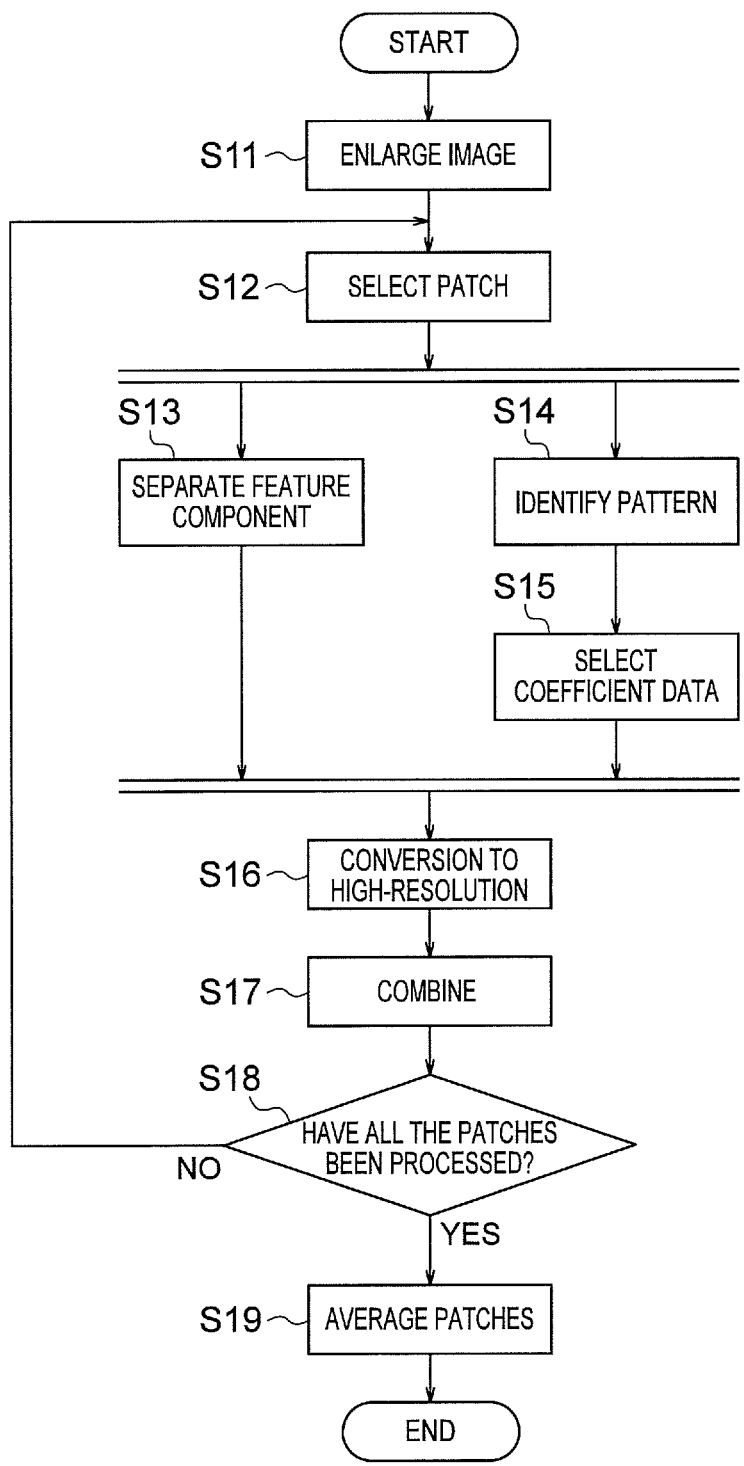
FIG. 11 is a flowchart showing the procedure in the image processing apparatus according to the first embodiment.

FIG. 11 shows the procedure of the processes in the image processing apparatus according to the first embodiment. In the operation of the image processing apparatus according to the first embodiment, first, in an image enlargement step S11 an input image Din is enlarged by the image enlarging unit 101 to generate a low-resolution enlarged image D101.

Next, in a patch selection step S12, a patch is selected from the low-resolution enlarged image D101. The patches are selected, for example, in a raster order, for example, in the order from the top left to the bottom right (from the top to the bottom, and from the left to the right at the same height position). Together with the selection of the patches, corresponding local regions in the input image Din are selected.

Next, in a step S13 to a step S17, for each of the patches in the low-resolution enlarged image D101, the processes by the feature component separating unit 102, the pattern identification unit 107, the coefficient data selection unit 108, the high-resolution conversion unit 103, and the feature component combining unit 104 are carried out.

In the processes for each patch (step S13 to step S17), first, in the feature component separation step S13, each patch is separated into a feature component D102H of the low resolution and a non-feature component D102L.

In parallel therewith, in the pattern identification step S14, pixels in a local region in the input image Din corresponding to each patch are used to identify the pattern, and a pattern identification signal D107 indicating the result of the identification is output.

Next, in the coefficient data selection step S15, coefficient data corresponding to the pattern identification signal D107 obtained in the step S14 are selected and output from the coefficient data storage unit 106.

In the high-resolution conversion step S16, carried out after the step S13 and the step S15, computation is made on the feature component D102H of each patch in the low-resolution enlarged image obtained in the step S13, using the coefficient data D108 selected in the step S15; thus conversion from the feature component D102H of a low resolution into the feature component D103H of a high resolution is performed.

Next, in the step S17, the non-feature component D102L separated in the step S13 is combined with the feature component D103H of the high resolution which is an output of the step S16, to generate a high-resolution patch.

Next, in a decision step S18, it is decided whether or not the processes of the steps S12 to S17 have been performed for all the patches in the image. If there remains any patch which has not been processed (NO in the step S18), the procedure goes back to the step S12, and a next patch is selected.

If, in the step S18, processes for all the patches are found to have been completed, the procedure proceeds to a patch averaging step S19, where the values of the high-resolution patches obtained for each pixel by the patch-by-patch processes are averaged by the patch averaging unit 105, to generate the output image Dout.

Incidentally, it may be so arranged that the process of the step S18 for each pixel is performed immediately after the patches to which the above-mentioned each pixel belong have been processed, even if all the patches in the image have not been processed. In this case, the processes of the steps S12 to S18, and the process of the step S18 are performed in parallel.

This completes a description of the operation of the image processing apparatus according to the first embodiment.

Next, a method of generating the coefficient data M will be explained. As was described before, the coefficient data M are a linear regression model which approximates the relation of the pair consisting of the feature component D102H of the low-resolution image generated from the training image, and the feature component D103H of the high-resolution image, and are stored in the coefficient data storage unit 106, after being obtained by learning in advance.

Figure 12:
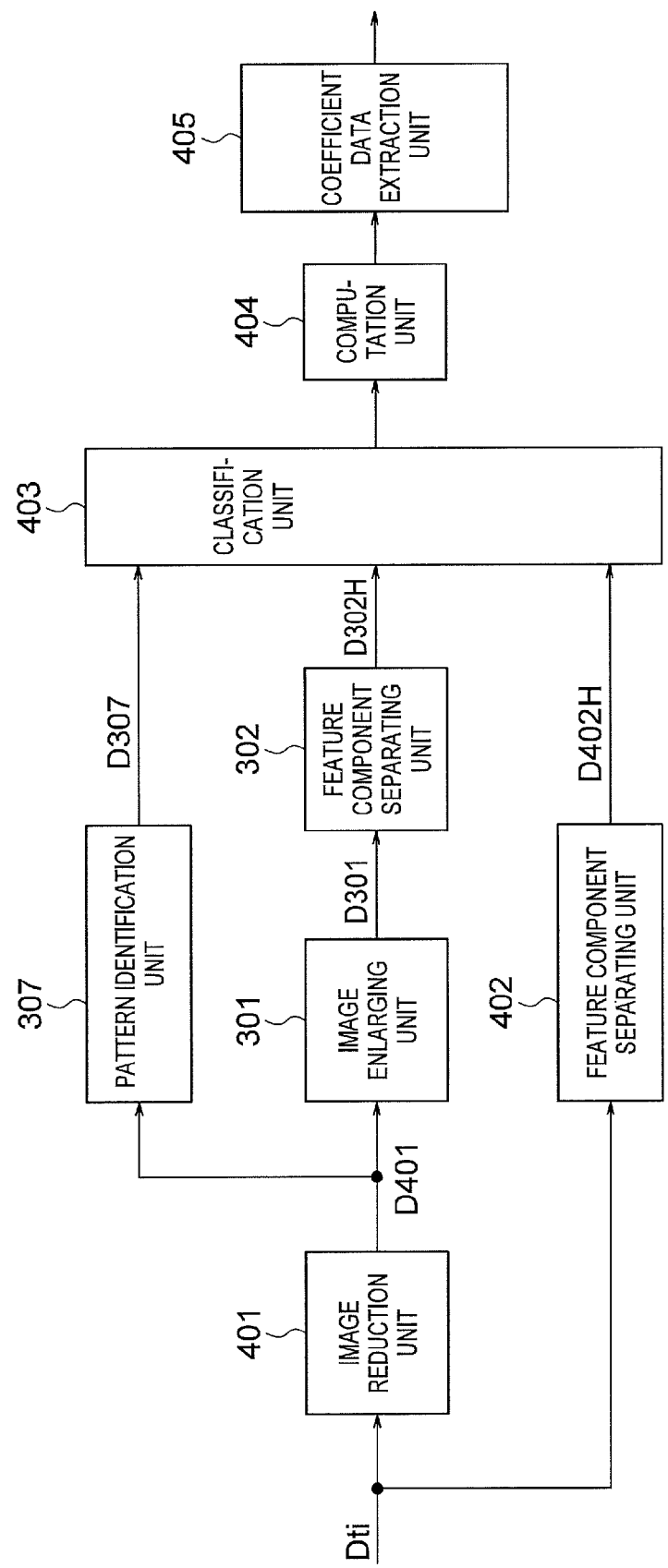
FIG. 12 is a block diagram showing an apparatus (coefficient data generation apparatus) used for generating coefficient data.

FIG. 12 shows an apparatus (coefficient data generating apparatus) used for generating the coefficient data.

Figure 13A:
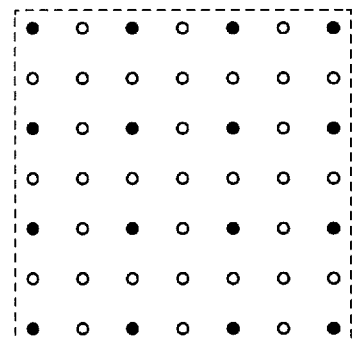
FIGS. 13(a) to (c) are drawings showing a training image, a reduced image obtained by reducing the training image, and a low-resolution enlarged image obtained by enlarging the reduced image.
Figure 13B:
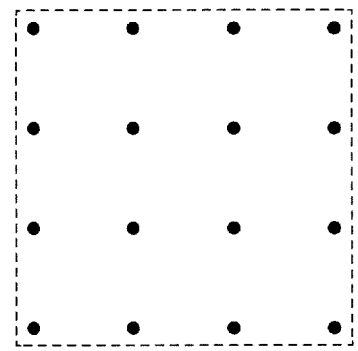
Figure 13C:
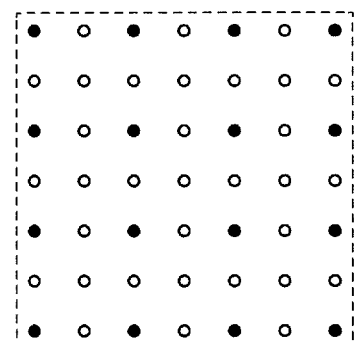

For the generation of the coefficient data, first, in an image reduction unit 401, a high-resolution image Dti (FIG. 13 (a)) serving as a training image is reduced to generate a reduced image (low-resolution image) D401 (FIG. 13 (b)). The reduction factor is identical to the enlargement factor in the image enlarging unit 101. The reduction may be performed by down-sampling, or by averaging. The pixels in the reduced image D401 in FIG. 13 (b) are at the same positions as the pixels indicated by black dots, among the pixels in the high-resolution image Dti in FIG. 13 (a).

Next, in a pattern identification unit 307, for each pixel in the reduced image D401, pattern identification is performed to output a pattern identification signal D307. The pattern identification by the pattern identification unit 307 is identical to the process by the pattern identification unit 107 in FIG. 1. However, whereas the pattern identification unit 107 identifies the pattern centered around the pixel at the center of the patch, the pattern identification unit 307 successively selects all the pixels in the reduced image D401 as a pixel of interest, and identifies the pattern of the 3×3 pixel region centered around the pixel of interest.

An image enlarging unit 301 enlarges the reduced image D401 (FIG. 13 (b)) to generate a low-resolution enlarged image D301 (FIG. 13 (c)). The process performed by the image enlarging unit 301 is identical to the process performed by the image enlarging unit 101 in FIG. 1. Among the pixels in the enlarged image D301 in FIG. 13 (c), those indicated by black dots are pixels at the same positions as the pixels in the reduced image D401 shown in FIG. 13 (b).

A feature component separating unit 302 extracts a feature component of each patch in the thus-obtained low-resolution enlarged image D301. That is, for each of the patches LPc (similar to LPc in FIG. 3) of a size of NL×NL pixels, centered around a pixel in the low-resolution enlarged image D301 (indicated by a black dot in FIG. 13 (c)) at the same position as a pixel in the reduced image D401, the feature component separating unit 302 determines a mean value tlMean of the NL×NL pixels, subtracts the mean value tlMean from the pixel values of the respective pixels to obtain NL×NL difference values, uses the thus-obtained NL×NL difference values as feature quantities, and outputs a column vector obtained by arranging the thus-obtained feature quantities in a predetermined order, as a feature component D302H. As a result of the above process, the feature component D302H is determined for each pixel in the reduced image D401.

A feature component separating unit 402 extracts a feature component of each patch in the high-resolution image Dti. That is, for each of the patches TPc (having the same size as LPc in FIG. 3) consisting of NL×NL pixels, centered around a pixel in the high-resolution image (training image) Dti (indicated by a black dot in FIG. 13 (a)) at the same position as a pixel in the reduced image D401, the feature component separating unit 402 determines a mean value thMean of the NL×NL pixels, subtracts the mean value thMean from the pixel values of the respective pixels to obtain NL×NL difference values, uses the thus-obtained NL×NL difference values as feature quantities, and outputs a column vector obtained by arranging the thus-obtained feature quantities in a predetermined order, as a feature component D402H. As a result of the above process, the feature component D402H is determined for each pixel in the reduced image D401.

The patches from which the feature component is separated by the feature component separating unit 302, and the patches from which the feature component is separated by the feature component separating unit 402 all have the same size (NL×NL) as the patches from which the feature component is separated by the feature component separating unit 102.

A patch of which a feature component is determined by the feature component separating unit 302, and a patch of which a feature component is determined by the feature component separating unit 402, for the same pixel in the reduced image D401 in combination form a pair (patch pair). Accordingly, the pixel at the center of the patch LPc in the low-resolution enlarged image D301 and the pixel at the center of the patch TPc in the high-resolution image Dti forming a patch pair are at the positions identical to each other.

A classification unit 403 associates, with each other, the feature components D302H and D402H of the patches forming each pair, and classifies (groups) each pair according to the result of the pattern identification by the pattern identification unit 307 (the value of the pattern identification signal D307) pertaining to the pixel at the center of the patches forming the pair.

A result of the classification, represented in the form a table, is for example as shown in FIG. 14. In FIG. 14, the values of the pattern identification signal D107 (values from 0 to 256) explained above in connection with the pattern identification unit 107 are entered in advance in the column of the pattern identification signal D307.

Pair numbers (they are all indicated by "xx" but their values differ) corresponding to the values of the identification signal are entered in the pair number column. For example, if, as a result of pattern identification on a pixel at the center of a patch forming a certain pair, a pattern identification signal D307 having a certain value is generated, the number of the pair is entered in the same row as the value. As the pair number, data representing the coordinates of the pixel at the center of the patch forming the pair may be used.

As a result of such grouping, the values of the identification signal and the pair numbers corresponding thereto are stored in association with each other.

So far, the description assumed that a single training image Dti is supplied, and the pattern identification, and the formation and classification of the patch pairs are performed using the single training image; but a plurality of training images Dti may be supplied in turn, and the pattern identification, and the formation and classification of the patch pairs may be performed using the plurality of training images, and the results of the processes may be accumulated in the classification unit 403.

A computation unit 404 determines, by linear regression computation, the values of the coefficient data for approximating the relation between the low-resolution patch and the high-resolution patch for each group of the pairs having the same pattern identification signal D307. The computation is represented by the following equation (10).

[Mathematical Expression 10]

$$Ms = (X_t^T \cdot X_t + \lambda \cdot eye(NL \times NL, NL \times NL))^{-1} \cdot X_t^T \cdot Y_t \qquad (10)$$

Figure 15:
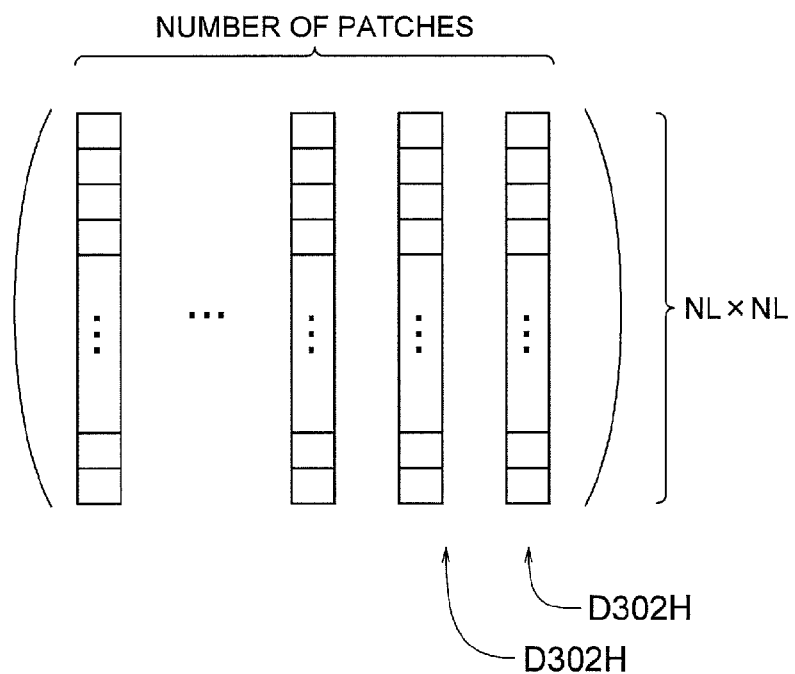
FIG. 15 is a drawing showing a matrix of coefficients of which the number of rows equals NL×NL and the number of columns equals the number of patches in the group.
Figure 16:
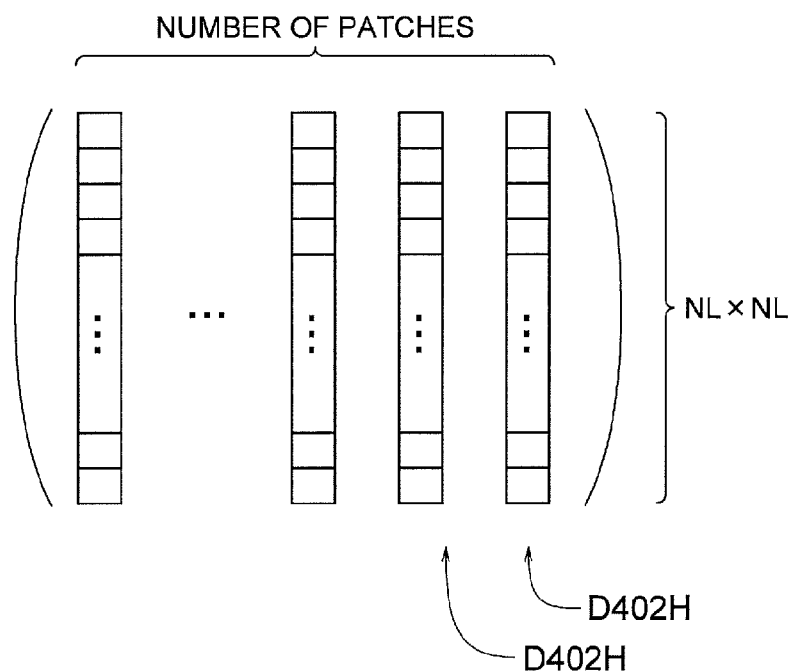
FIG. 16 is a drawing showing a matrix of coefficients of which the number of rows equals NH×NH and the number of columns equals the number of patches in the group.

Here, the matrix Ms represents coefficient data consisting of components in NL×NL rows and NL×NL columns, for the pattern identification signal of the group;

Xt represents a matrix with the number of rows being equal to (NL×NL) and the number of columns being equal to the number of patches in the group, obtained by forming a vector from the low-resolution patches in the group (patches having undergone the separation of the feature component in the feature component separating unit 302), that is, a matrix in which the NL×NL feature quantities, namely the difference values constituting the feature component D302H of each low-resolution patch forming a pair having been classified in the group are arranged in the column direction, and the feature components D302H of different patches are arranged in the row direction (disposed in different columns), as shown in FIG. 15;

Yt represents a matrix with the number of rows being equal to (NL×NL) and the number of columns being equal to the number of patches in the group, obtained by forming a vector from the high-resolution patches in the group (patches having undergone the separation of the feature component in the feature component separating unit 402), that is, a matrix in which the NL×NL feature quantities, namely the difference values constituting the feature component D402H of each high-resolution patch forming a pair having been classified in the group are arranged in the column direction, and the feature components D402H of different patches are arranged in the row direction (disposed in different columns), as shown in FIG. 16;

λ represents a predetermined constant; and eye(NL×NL,NL×NL) represents an identity matrix having NL×NL rows and NL×NL columns.

Also, $Xt^T$, $Yt^T$ respectively represent transposed matrixes of Xt, Yt.

If the number of patches in each group is less than (NL×NL), an identity matrix is output as Ms.

A coefficient data extraction unit 405 extracts, from the matrix Ms having NL×NL rows and NL×NL columns obtained in the manner described above, a matrix M having NH×NH rows and NL×NL columns, by extracting the elements corresponding to NH×NH pixels constituting a high-resolution patch HPc (the elements used for the calculation of the feature component D103H of the NH×NH pixels), and causes the matrix M to be stored in the coefficient data storage unit 106.

Figure 18:
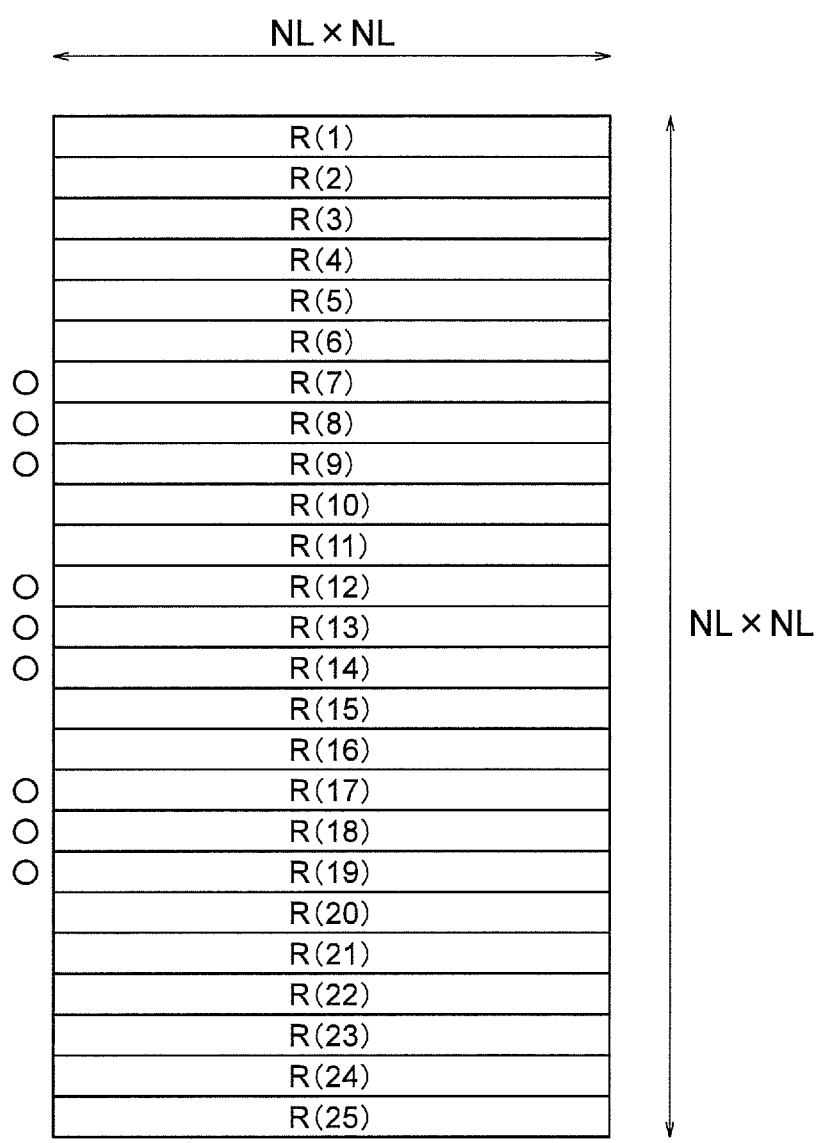
FIG. 18 a drawing showing coefficients used for the calculation of NH×NH pixels, in a matrix Ms of coefficients having NL×NL rows and NL×NL columns obtained by regression computation.

For the case of NL=5, NH=3, as shown in FIG. 17, the rows extracted from the matrix Ms having NL×NL rows and NL×NL columns, for the generation of the matrix M having NH×NH rows and NL×NL columns are shown in FIG. 18. In FIG. 17, the pixels in the patch consisting of NL×NL pixels are indicated by reference characters P(1) to P(25). Of the reference characters P(1) to P(25), the numerals in the parentheses are the numbers assigned to the pixels. In FIG. 18, the numerals in the parentheses in the reference characters R(1) to R(25) indicating the rows represent the numbers of the rows. The rows R(1) to R(25) in FIG. 18 respectively correspond to the pixels P(1) to (25).

NH×NH pixels constituting a high-resolution patch HPc within the patch LPc consisting of NL×NL pixels shown in FIG. 17, are pixels within the part surrounded by a thick line HPc shown in FIG. 17, and correspond to the NH×NH pixels Q(1) to Q(9) in FIG. 6. The rows extracted as shown in FIG. 18 are rows consisting of the coefficients used for the calculation of the NH×NH pixels Q(1) to Q(9) shown in FIG. 6, and are the rows R(7), R(8), R(9), R(12), R(13), R(14), R(17), R(18), and R(19) corresponding to the pixels P(7), P(8), P(9), P(12), P(13), P(14), P(17), P(18), and P(19) in the region surrounded by the thick line HPc, among the NL×NL pixels, and these rows are marked with a circle at the left end in FIG. 18.

The above process is performed for each of the 257 values of the pattern identification signal, and the coefficient data M corresponding to each of the 257 values of the pattern identification signal are stored in the coefficient data storage unit 106.

The above-described method of generating the coefficient data relates to a case where the conversion by the high-resolution conversion unit 103 is linear; for the case of non-linear conversion, it is possible to calculate the coefficient data using a known optimization method.

This completes a description of the method of generating the coefficient data.

The effects of the image processing apparatus according to the first embodiment will next be described.

The image processing apparatus according to the first embodiment performs the high-resolution conversion process on a patch-by-patch basis, by having the pattern identification unit 107 identify the pattern of the local region in the input image Din, and the coefficient data selection unit 108 select the coefficient data corresponding to the pattern identification signal D107, from among the coefficient data stored for the respective patterns.

As a result, it is not necessary to perform, for each patch, similarity calculation for the number of dimensions of the search vector, for the search of the learned database, as in the conventional method; it suffices to generate, for each patch, the pattern identification signal D107, from the group of pixels in the local region in the input image Din, and to select the coefficient data according the generated pattern identification signal D107. Accordingly, the circuit size can be reduced.

Also, the LBP calculation unit 202 in the pattern identification unit 107 performs the pattern identification using the local binary pattern (LBP). As a result, it is possible to determine the pattern number Pnum only by comparison of the pixel values of the eight pixels in the vicinity of the pixel of interest with the average value AVE, so that the size of the circuit required for the determination of the pattern number Pnum can be reduced.

Also, by using the LBPs for the pattern identification, the coefficient data storage unit 106 only needs to store 257 sets of coefficient data, including the coefficient data corresponding to 256 values of the pattern number Pnum, and the coefficient data corresponding to the case where the flatness decision signal Flat is "1", so that it is not necessary to store a large number of patches in the learned database, and the memory capacity can therefore be reduced.

Furthermore, the flatness decision unit 203 in the pattern identification unit 107 calculates the average diff of the absolute differences between the pixel values of the eight pixels in the vicinity of the pixel of interest and the average value AVE, and compares the average diff with a preset threshold sig to make the flatness decision, and when the local region corresponding to the patch is found to be flat, no substantial alteration is made to the pixel values in the high-resolution conversion unit 103.

As a result, when noise is mixed in the local region corresponding to the patch of interest, and the average diff of the absolute differences is smaller than the threshold sig, the local region corresponding to the patch is found to be flat, and the process in the high-resolution conversion unit 103 is not performed, so that it is possible to prevent picture quality degradation due to erroneous selection of the coefficient data (selection of data which are different from those which ought to be referred to), affected by the noise pattern.

In particular, the conventional method using LBPs for pattern identification has a drawback in that the noise immunity is low. In the LBP calculation, the pattern is determined based on the results of the magnitude comparison, without regard to the magnitude of the difference values, between the pixel values of the eight pixels in the vicinity of the pixel of interest and the average value AVE, so that, even for a flat region with little variation in the pixel values, noise pattern is determined to be a specific pattern. In such a case, the high-resolution conversion unit 103 performs a process to enhance the noise pattern, which may differ from the actual pattern, with the result that the picture quality is degraded.

In contrast, by finding a region with little variation in the pixel values to be a flat region, and by having in the high-resolution conversion unit 103 make no substantial alteration to the pixel values in the flat region, it is possible to preserve the merits of the reduction in the circuit size and the memory capacity owing to the use of LBPs, while at the same time avoiding the picture quality degradation due to noise pattern enhancement in most cases. Accordingly, the noise immunity is improved.

The present invention has been described as an image processing apparatus, but an image processing method implemented in the image processing apparatus also forms a part of the present invention. Part or the entirety of the elements constituting the above-described image processing apparatus, or part or the entirety of the processes in the above-mentioned image processing method can be implemented by software, that is by a programmed computer.

As has been described above, according to the present invention, the circuit size and the memory capacity can be reduced, and the noise immunity is improved, so that it is possible to achieve high-quality conversion to a high-resolution, which is suitable for implementation by hardware.

REFERENCE CHARACTERS 101 image enlarging unit, 102 feature component separating unit, 103 high-resolution conversion unit, 104 feature component combining unit, 105 patch averaging unit, 106 coefficient data storage unit, 107 pattern identification unit, 108 coefficient data selection unit, 201 average unit, 202 LBP calculation unit, 203 flatness decision unit, 204 pattern identification signal generating unit, 301 image enlarging unit, 302 feature component separating unit, 307 pattern identification unit, 401 image reduction unit, 402 feature component separating unit, 403 classification unit, 404 computation unit, 405 coefficient data extraction unit.

What is claimed is:

1. An image processing apparatus comprising:
an image enlarging unit for enlarging an input image to generate a low-resolution enlarged image;
a feature component separating unit for separating said low-resolution enlarged image into a feature component of a low resolution and a non-feature component for each patch;
a high-resolution conversion unit for converting said feature component of the low resolution into a feature component of a high resolution;
a feature component combining unit for combining said feature component of the high resolution and said non-feature component to generate a high-resolution patch;
a patch averaging unit for averaging, for each pixel, values of one or more high-resolution patches to generate an output image;
a coefficient data storage memory that stores a plurality of sets of coefficient data respectively corresponding to a plurality of mutually different patterns;
a pattern identification unit for identifying a pattern of a local region in said input image, corresponding to a patch in said low-resolution enlarged image, and outputting a pattern identification signal indicating a result of the identification; and
a coefficient data selection unit for selecting, from among the plurality of sets of coefficient data stored in said coefficient data storage memory, a set of coefficient data corresponding to said pattern identification signal, and outputting the selected set of coefficient data; wherein
said high-resolution conversion unit converts said feature component of the low resolution into said feature component of the high resolution, using said coefficient data selected by said coefficient data selection unit.

2. The image processing apparatus as set forth in claim 1, wherein
said pattern identification unit includes a flatness decision unit for deciding whether or not the pattern of said local region in said input image is flat, and
said coefficient data selection unit performs the selection of said coefficient data based on a result of the decision by said flatness decision unit.

3. The image processing apparatus as set forth in claim 2, wherein said coefficient data selected when the result of the decision by said flatness decision unit indicates flatness are such coefficient data by which no substantial alteration is made to the pixel values in the conversion at said high-resolution conversion unit.

4. The image processing apparatus as set forth in claim 1, wherein
said pattern identification unit includes a flatness decision unit for deciding whether or not the pattern of the local region in said input image is flat;
when the result of the decision by said flatness decision unit indicates non-flatness, said high-resolution conversion unit outputs, as said feature component of the high resolution, a result of the conversion of said feature component of the low-resolution using said coefficient data, and
when the result of the decision by said flatness decision unit indicates flatness, said high-resolution conversion unit outputs, as said feature component of the high resolution, entirety or part of said feature component of the low resolution, as it is, without using said coefficient data.

5. The image processing apparatus as set forth in claim 1, wherein said pattern identification unit includes:
an average unit for taking, as a pixel of interest, a pixel at a position in said input image, corresponding to a center of the patch in said low-resolution enlarged image, and determining an average value of pixel values of pixels in the local region centered around said pixel of interest;
an LBP calculation unit for comparing pixel values of pixels neighboring said pixel of interest, with said average value, and generating a pattern number representing a combination of results of the comparison pertaining to the respective pixels;
a flatness decision unit for deciding whether or not said local region is flat, based on whether or not an average of absolute values of differences between the pixel values of the pixels neighboring said pixel of interest and said average value is smaller than a predetermined threshold value, and outputting a flatness decision signal indicating a result of the decision; and
a pattern identification signal generating unit for generating the pattern identification signal from said pattern number and said flatness decision signal.

6. The image processing apparatus as set forth in claim 1, wherein said pattern identification unit includes:
- an average unit for taking, as a pixel of interest, a pixel at a position in said input image, corresponding to a center of the patch in said low-resolution enlarged image, and determining an average value of pixel values of pixels in the local region centered around said pixel of interest;
- an LBP calculation unit for comparing pixel values of pixels neighboring said pixel of interest, with said average value, and generating a pattern number representing a combination of results of the comparison pertaining to the respective pixels, as said pattern identification signal; and
- a flatness decision unit for deciding whether or not said local region is flat, based on whether or not an average of absolute values of differences between the pixel values of the pixels neighboring said pixel of interest and said average value is smaller than a predetermined threshold value, and outputting a flatness decision signal indicating a result of the decision; wherein
- said high-resolution conversion unit receives said flatness decision signal,
- when said flatness decision signal indicates non-flatness, said high-resolution conversion unit outputs, as said feature component of the high-resolution, a result of the conversion from said feature component of the low resolution using said coefficient data, and
- when said flatness decision signal indicates flatness, said high-resolution conversion unit outputs, entirety or part of said feature component of the low resolution, as it is, without using said coefficient data.

7. The image processing apparatus as set forth in claim 1, wherein said non-feature component separated by said feature component separating unit is a mean value of pixel values of pixels constituting said patch, and said feature component of the low-resolution separated by said feature component separating unit is formed of differences of the pixel values of the pixels constituting said patch, from said mean value.

8. The image processing apparatus as set forth in claim 7, wherein said feature component combining unit performs the combination by adding said non-feature component to said feature component.

9. An image processing method comprising:
- an image enlarging step for enlarging an input image to generate a low-resolution enlarged image;
- a feature component separating step for separating said low-resolution enlarged image into a feature component of a low resolution and a non-feature component for each patch;
- a high-resolution conversion step for converting said feature component of the low resolution into a feature component of a high resolution;
- a feature component combining step for combining said feature component of the high resolution and said non-feature component to generate a high-resolution patch;
- a patch averaging step for averaging, for each pixel, values of one or more high-resolution patches to generate an output image;
- a pattern identification step for identifying a pattern of a local region in said input image, corresponding to a patch in said low-resolution enlarged image, and outputting a pattern identification signal indicating a result of the identification; and
- a coefficient data selection step for selecting, from among a plurality of sets of coefficient data stored respectively corresponding to a plurality of mutually different patterns in a coefficient data storage memory, a set of coefficient data corresponding to said pattern identification signal, and outputting the selected set of coefficient data; wherein
- said high-resolution conversion step converts said feature component of the low resolution into said feature component of the high resolution, using said coefficient data selected by said coefficient data selection step.

* * * * *